Oct. 24, 1944.  A. C. MONTEITH  2,361,229

ELECTRICAL GENERATING STATION

Filed March 13, 1943  2 Sheets-Sheet 1

WITNESSES:
E. A. McCloskey.
Nw. C. Groome

INVENTOR
Alexander C. Monteith.
BY C. L. Freedman
ATTORNEY

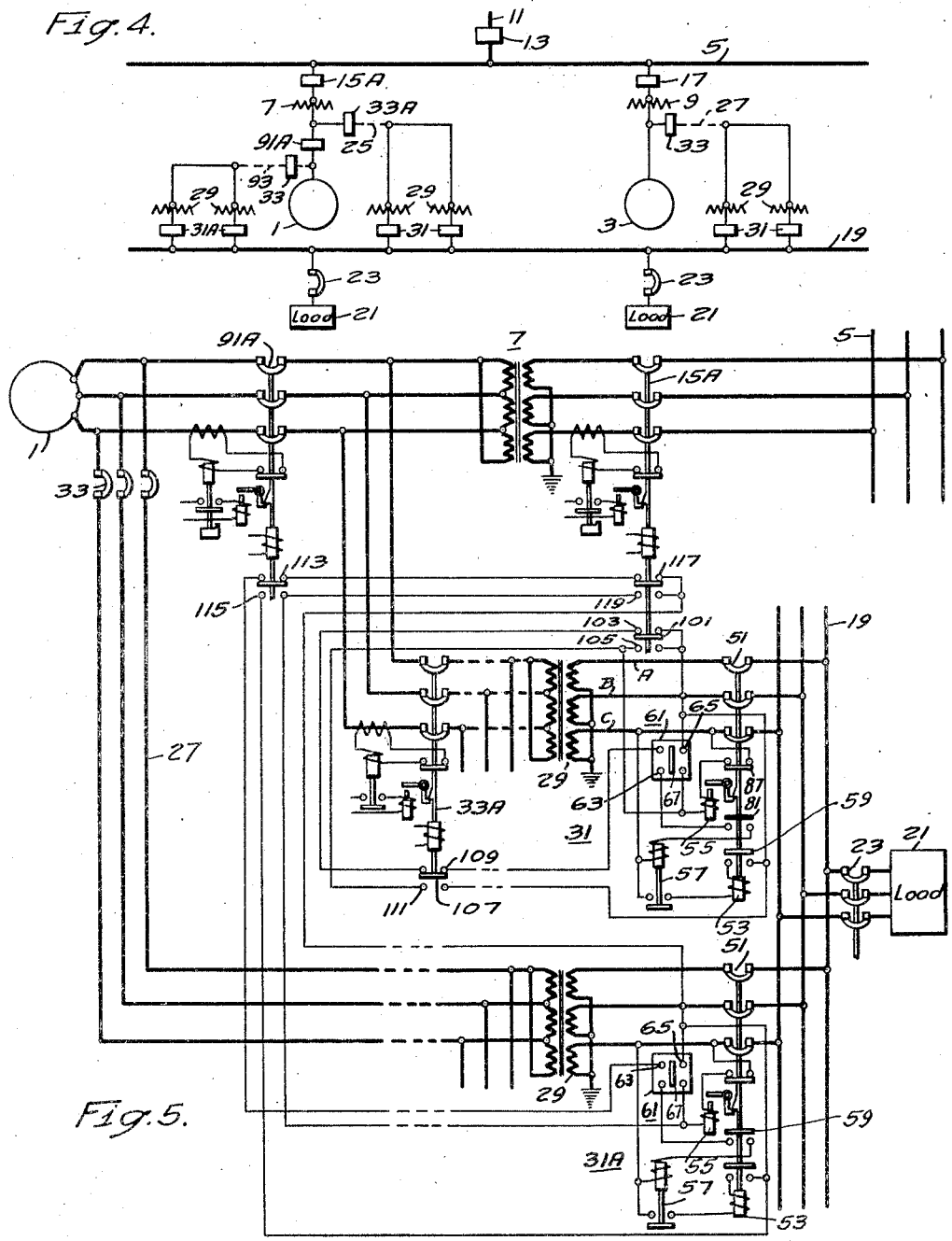

Patented Oct. 24, 1944

2,361,229

UNITED STATES PATENT OFFICE 2,361,229

ELECTRICAL GENERATING STATION

Alexander C. Monteith, Wilkinsburg, Pa., assignor to Westinghouse Electric & Manufacturing Company, East Pittsburgh, Pa., a corporation of Pennsylvania Application March 13, 1943, Serial No. 479,032

14 Claims. (Cl. 171—97)

This invention relates to electrical systems, and it has particular relation to systems for supplying electrical energy to auxiliary equipment in electrical generating stations.

Because of the importance of insuring continuous operation of equipment in electrical generating stations, extreme care is taken in the design of such stations. Much auxiliary equipment in electrical generating stations, such as draft fans and stokers, is operated by means of electrical motors. Some of the auxiliary equipment as boiler feed pumps, draft fans, unit type pulverizers, etc. may be termed essential auxiliary equipment. Electrical service to essential auxiliary equipment cannot be interrupted even for a fraction of a minute.

In accordance with the invention, auxiliary equipment in an electrical generating system is supplied with electrical energy through a network system. This network system includes a load circuit which may be in the form of a mesh grid circuit, a loop circuit, or a load bus which is energized through one or more feeder circuits connected to each of the electrical generators in the generating station or to other sources of electrical power. Connection of the feeder circuits to the load bus or other circuit employed for supplying electrical energy to the auxiliary equipment may be effected through network protectors which trip to disconnect each feeder circuit from the load bus in response to a fault on the feeder circuit.

When two or more electrical generators are connected to a power bus, synchronizing currents flow through the power bus, to maintain synchronism between the generators. To avoid synchronization of the generators through the load bus, the invention contemplates further an interlocking of the network protectors employed for connecting the feeder circuits to the load bus to prevent closure of the network protectors unless the associated electrical generator is connected to its power bus.

It is, therefore, an object of the invention to provide an improved system for supplying electrical energy to auxiliary equipment in electrical generating stations.

It is a further object of the invention to provide an electrical generating station having a plurality of electrical generators associated with a power bus, with a load bus connected to each of the generators through a separate feeder circuit, and with means for preventing connection of each feeder circuit to the load bus unless the associated electrical generator is connected to its power bus.

Other objects of the invention will be apparent from the following description taken in connection with the accompanying drawings, in which:

Figs. 3 and 4 are schematic views in single line showing modifications of the system illustrated in Fig. 1; and Fig. 5 is a schematic view in greater detail showing a portion of the system illustrated in Fig. 4.

Figure 1:
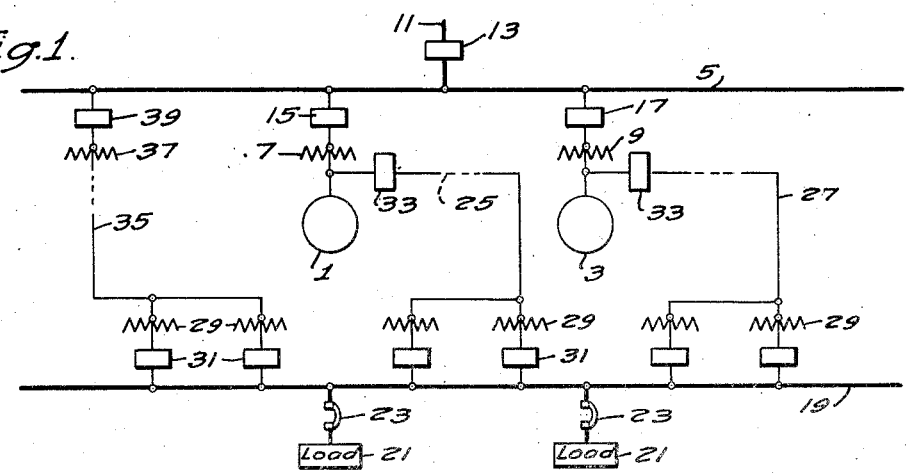
Figure 1 is a schematic view in single line of an electrical system embodying the invention.

Referring to the drawings, Fig. 1 shows an electrical system wherein two electrical generators 1 and 3 are connected to a power bus 5, respectively, through transformers 7 and 9. The form of the system in Fig. 1 may vary appreciably. The system may be arranged for single phase or polyphase operation, and it may be designed for operation at various frequencies. The power bus 5 may be connected to other electrical systems through one or more connecting circuits 11 each having a circuit interrupter 13 associated therewith for controlling the connection of the connecting circuit to the power bus 5. This connecting circuit 11 may be designed to transmit electrical energy from the power bus 5 or toward the power bus. The connection of the electrical generators 1 and 3 to the power bus 5 are controlled, respectively, by circuit interrupters 15 and 17.

As previously pointed out, electrical generating stations have associated therewith various auxiliary equipment which must be supplied with electrical energy. For this purpose, a load circuit is provided which may be in the form of a mesh grid circuit, a loop circuit, or a load bus. For the purpose of discussion, it is assumed that a load bus 19 is provided. The auxiliary equipment represented by loads 21 may be connected for energization from the load bus 19 through suitable circuit interrupters 23.

Electrical energy is supplied to the load bus 19 through one or more feeder circuits associated with each of the electrical generators. In Fig. 1, a feeder circuit 25 is associated with the electrical generator 1, and a feeder circuit 27 is associated with the electrical generator 3. Each of the feeder circuits is connected to the load bus through one or more transformers, which may be termed network transformers 29, and network protectors 31. The construction of the network protectors 31 may vary appreciably. For example, the network protector may include a circuit interrupter controlled by relays to trip in response to a reversal in the normal direction of current flow therethrough. The circuit interrupter is also controlled to close when the voltage and phase relationships across its poles are such as to assure the direction of current flow from the associated network transformer 29 to the load bus 19. A network protector of this type is disclosed in the Parsons Patent 1,997,697.

To remove a faulty feeder circuit from service without interrupting the operation of the remainder of the electrical system, each of the feeder circuits may, if desired, be provided with a feeder-circuit-interrupter 33 which may be designed to trip when current flowing therethrough exceeds a predetermined value.

In the system illustrated in Fig. 1, the electrical generators 1 and 3 are intended to be synchronized through the power bus 5. In order to prevent synchronization of the generators through the load bus 19, the network protectors 31 associated with each feeder circuit may be interlocked with the associated circuit interrupters 15 and 17 to remain in closed position only when the associated circuit interrupter 15 or 17 is in closed condition. With such a construction, both of the circuit interrupters 15 and 17 must be closed before their associated network protectors 31 can be closed. Consequently, complete synchronization of the generators 1 and 3 cannot take place through the load bus 19.

If both of the electrical generators 1 and 3 are out of service, and it is desired to start the generating station, electrical energy for the auxiliary equipment must be supplied from a source other than the electrical generators. To this end, a feeder circuit 35 is provided which is connected at one end to the load bus 19 through network transformers 29 and network protectors 31. The remaining end of the feeder circuit 35 is connected to the power bus 5 through a transformer 37 and a circuit interrupter 39.

Before proceeding with a detailed discussion of the component parts of the system illustrated in Fig. 1, a brief review of the operation of the system may prove to be helpful. Assuming that the electrical generators 1 and 3 are both out of service and that it is desired to start the generating station, the circuit interrupters 13 and 39 are closed to energize the feeder circuit 35. If the network protectors 31 associated with the feeder circuit 35 are of the automatic closing type, disclosed in the aforesaid Parsons patent, these protectors close to complete the connection of the load bus 19 to the power bus 5. Consequently, closure of the circuit interrupters 23 energizes the auxiliary equipment with electrical energy supplied by the connecting circuit 11.

After the auxiliary equipment has been energized for a sufficient length of time, one of the generators, such as the generator 1, may be brought up to its rated rate of rotation and connected to the power bus 5 by closure of the circuit interrupter 15. Closure of the circuit interrupter 15 releases the interlock on the network protectors 31 associated with the feeder circuit 25 and permits closure of these network protectors. Thereafter the load bus 19 is energized through both of the feeder circuits 25 and 35.

If a second generator is to be placed in service, the generator 3 is brought up to its rated rate of rotation. It should be observed at this point that even though the generator 3 is in condition to supply electrical energy to the remainder of the system, it cannot be connected to the load bus 19 through its feeder circuit 27 until the associated circuit interrupter 17 is closed to connect the generator to the power bus 5. For this reason, the generators 1 and 3 are not synchronized through the load bus 19 alone, but are synchronized in the desired manner through the power bus 5. After closure of the circuit interrupter 17, the interlock on the network protectors 31 associated with the feeder circuit 27 is released to permit connection of the feeder circuit 27 to the load bus 19. Thereafter electrical energy is supplied to the load bus 19 through the three feeder circuits 25, 27 and 35.

Should a fault occur on one of the feeder circuits such as the feeder circuit 25, the direction of current flow through its associated network protectors reverses and flows from the load bus 19 to the fault. Therefore, the network protectors 31 associated with the feeder circuit 25 trip to disconnect the feeder circuit from the load bus 19. In addition, the feeder-circuit interrupter 33, if provided, trips to complete the disconnection of the feeder circuit 25 from the remainder of the system. Consequently, the entire system, with the exception of the feeder circuit 25, continues in operation, and the load bus 19 receives electrical energy without interruption from the feeder circuits 27 and 35. In a similar manner, if a fault occurs on the feeder circuit 27, this feeder circuit is removed from service by operation of its associated network protectors 31 and circuit interrupter 33. Should a fault occur on the feeder circuit 35, tripping of the circuit interrupter 39 and of the network protectors 31 removes this feeder circuit from service. Since the general operation of the system now is understood, the portion of the system illustrated in detail in Fig. 2 may be considered.

Figure 2:
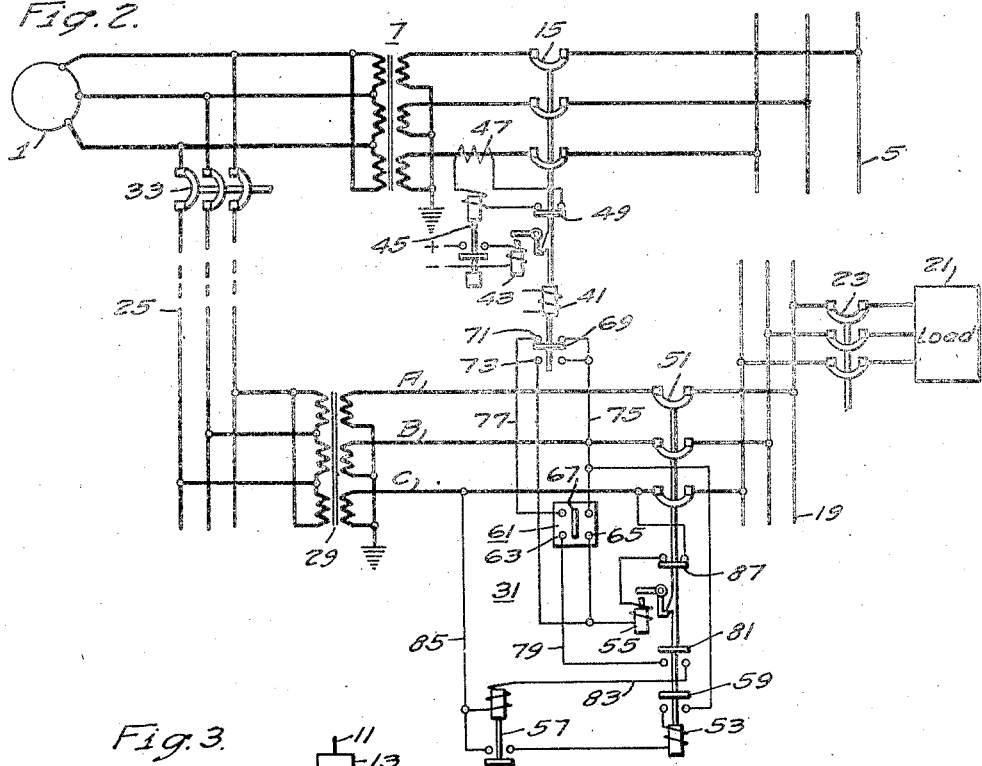
Fig. 2 is a schematic view in greater detail showing a portion of the system in Fig. 1.

In Fig. 2, the electrical system of Fig. 1 is represented as a three-phase system designed for operation at a suitable frequency such as 60 cycles per second. As examples of voltages which may be encountered in practice, the generator may be designed to generate electrical energy at 13.2 kilovolts which is stepped up by the transformer 7 to a phase-to-phase voltage of 66 kilovolts. The transformer 29 may be designed to step down the voltage generated by the electrical generator 1 to a phase-to-phase voltage of 460 volts. Although the transformers 7 and 29 may be of any desired type, they are illustrated as having delta-connected primary windings and star-connected, grounded-neutral secondary windings.

The circuit interrupter 15 which connects the transformer 7 to the power bus 5 may be of any suitable construction. As illustrated, the circuit interrupter includes a closing motor or solenoid 41 which may be energized in any conventional manner from any suitable source to close the circuit interrupter. In addition, the circuit interrupter includes a tripping solenoid 43. This tripping solenoid may be connected for energization to a suitable source of energy by operation of a relay 45 which is responsive to any desired characteristic of the electrical generator 1. In the specific embodiment of Fig. 2, the relay 45 may take the form of a standard over-current relay which is energized from a current transformer 47 through the front contacts of a pallet switch 49 associated with the circuit interrupter

15. The relay 45 conveniently may be of the inverse-time-delay type. Although only one relay is illustrated associated with one phase conductor of the electrical system, it will be understood that additional relays and current transformers may be similarly associated with other phase conductors of the electrical system in a manner well understood in the art.

For controlling the connection of the feeder circuit 25 to the electrical generator 1, the circuit interrupter 33 may be of any suitable construction such as that illustrated for the circuit interrupter 15. The circuit interrupters 17 and 39 of Fig. 1 may be similar to the circuit interrupter 15.

The network protector 31 includes a circuit interrupter 51 having a closing motor or solenoid 53 and a tripping solenoid 55. Energization of the closing solenoid 53 is effected by connecting the solenoid across two of the three phase conductors A, B and C, such as the phase conductors B and C. The solenoid is connected to the phase conductors B and C, and the secondary winding of the transformer 29, through a circuit including the front contacts of a closing relay 57. Back contacts of a pallet switch 59 which is operated by the circuit interrupter 51 are included in this circuit.

Closure and tripping of the circuit interrupter 51 may be controlled in part by a master relay 61 having closing contacts 63 and tripping contacts 65 positioned to be engaged selectively by a movable contact 67. The construction of the master relay is well understood in the art and may take the form of one of the master relays illustrated in the aforesaid Parsons patent. Such a relay may be designed to close its tripping contacts when the direction of energy flow through the poles of the circuit interrupter 51 reverses from its normal direction. Such reversal may take place when a fault occurs on the feeder circuit 25. The master relay may be designed to close its closing contacts 63 when the voltages across the poles of the circuit interrupter 51 is such that electrical energy will be supplied from the transformer 29 to the load bus 19.

As previously pointed out, the network protector 31 is interlocked with the circuit interrupter 15 to prevent the circuit interrupter 51 from being in its closed condition unless the circuit interrupter 15 is in its closed condition. For this purpose, the circuit interrupter 15 may be provided with a pallet switch 69 having front contacts 71 and back contacts 73. These front and back contacts are closed respectively when the circuit interrupter 15 is in its closed or open condition. The front contacts 71 of the pallet switch 69 are in series with the closing contact 63 of the master relay to prevent a closing operation of the circuit interrupter 51 unless both pairs of contacts are closed. Closure of both pairs of contacts completes an energizing circuit for the closing relay 57 which may be traced from the conductor B through a conductor 75, the front contacts 71, a conductor 77, the closing contacts 63, a conductor 79, a pallet switch 81 associated with the circuit interrupter 51, a conductor 83, the energizing winding of the closing relay 57, and a conductor 85 to the conductor C. Completion of this energizing circuit energizes the closing relay 57 to complete an energizing circuit for the closing solenoid 53.

For controlling the tripping of the circuit interrupter 51, the back contacts 73 of the pallet switch and the tripping contacts 65 of the master relay are connected in parallel. Closure of either pair of these contacts connects the tripping solenoid 55 of the circuit interrupter 51 across the phase conductors B and C through a pallet switch 87 associated with the circuit interrupter 51.

From this discussion of the interlocking connections between the circuit interrupters 15 and 51, it will be appreciated that if the circuit interrupter 15 is in open condition, the circuit interrupter 51 cannot be closed. After the circuit interrupter 15 has been operated to closed condition, the circuit interrupter 51 is also closed, provided the voltage conditions across its poles are such as to actuate the movable contact 67 of the master relay into engagement with the closing contacts 63 thereof. With both of the circuit interrupters in closed condition, tripping of the circuit interrupter 15 closes the back contacts 73 thereof to trip the circuit interrupter 51.

The circuit interrupter 17 may be interlocked similarly with its network protectors. Such interlocking is not required, however, for the circuit interrupter 39 and network protectors of the feeder circuit 35.

Figure 3:
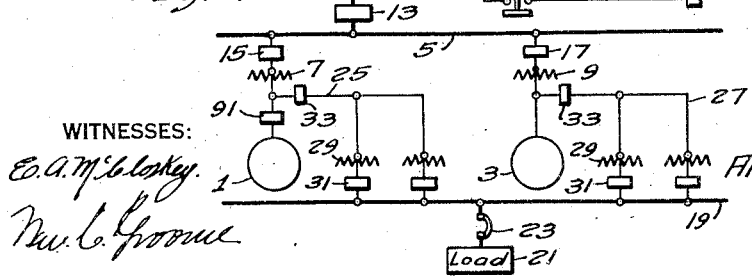

In prior art electrical generating stations, the feeder circuit 35, transformer 37, and circuit interrupter 39 generally are available. For this reason, the application of the network system thereto may be in accordance with the embodiment illustrated in Fig. 1. In new installations, however, the transformer 37 and feeder circuit 35 may be omitted, if desired. Such omissions result in a system similar to that illustrated in Fig. 3. Referring to Fig. 3, the electrical generators 1 and 3 are associated with the power bus 5 and the load bus 19 in substantially the same manner illustrated in Fig. 1. The only difference resides in the provision of a circuit interrupter 91 which is positioned between the electrical generator 1 and the feeder circuit 25.

If both of the generators 1 and 3 of the system illustrated in Fig. 3 are out of service, and it is desired to start the generating station in operation, the circuit interrupter 91 is left in open condition. The circuit interrupters 15 and 33 and the network protectors 31 associated with the generator 1 are all closed to connect the load bus 19 to the power bus 5. Such connection provides electrical energy for the auxiliary equipment of the generating station and permits the starting of this equipment. When the electrical generator 1 is in condition to supply electrical energy to the power bus 5, the circuit interrupter 91 is closed and the operation of the system thereafter corresponds to that of the system shown in Fig. 1. The circuit interrupter 91 may be of any suitable construction and may be designed for manual control. For the purpose of discussion, it may be assumed that the circuit interrupter 91 is similar in construction and operation to the circuit interrupter 15 with the exception of the omission of the pallet switch 69 thereof.

If desired, the system of Fig. 3 may include a circuit interrupter 91 for the electrical generator 3. However, for the purpose of discussion, it is assumed that the feeder circuit 25 and associated transformers are sufficient to supply energy to the auxiliary equipment for both of the electrical generators. Consequently, the electrical generator 3 may have connections to the power bus 5 and the load bus 19 which are similar to those illustrated in Fig. 1.

If a generating station is to be constructed having only one generator installed initially but having provision for subsequent addition of one or more electrical generators, a construction similar to that illustrated in Fig. 4 may be employed. Referring to Fig. 4, the electrical generator 1 is connected to the power bus 5 through the transformer 7 and the circuit interrupters 15A and 91A which correspond to the circuit interrupters 15 and 91 of Fig. 3. In addition, the electrical generator 1 and the power bus 5 may be connected through the feeder circuit 25, the network transformers 29, and the network protectors 31 to the load bus 19. The feeder circuit 25 includes a feeder circuit interrupter 33A which corresponds to the feeder circuit interrupter 33 of Fig. 3.

In addition, the electrical generator 1 is connected through a circuit interrupter 33, feeder circuit 93, network transformers 29, and network protectors 31A to the load bus 19. The protectors 31 of the feeder circuit 25 are interlocked with the circuit interrupters 15A and 33A to prevent their closure unless both of the circuit interrupters 15A and 33A are closed. The protectors 31 also are interlocked with the circuit interrupters 15A and 33A to trip if either of the circuit interrupters 15A or 33A trips. In a somewhat similar manner, the protectors 31A, which are similar to the protectors 31 in construction, are interlocked with the circuit interrupters 15A and 91A to permit closure of the protectors only if both of the circuit interrupters 15A and 91A are closed. If either of the circuit interrupters 15A or 91A trips, the interlocking effects a tripping of the protectors 31A.

Assuming that only the electrical generator 1 is installed in the generating station illustrated in Fig. 4, the operation of the station may be set forth. If the generating station is to be initially started, the circuit interrupter 91A is in open condition, whereas the circuit interrupters 15A, 33A, and the protectors 31 are all closed. This energizes the load bus 19 through the feeder circuit 25 from the power bus 5, and permits energization of the auxiliary equipment in the generating station. When the generator 1 is in condition to supply electrical energy to the power bus 5, the circuit interrupter 91A is closed. In addition, the circuit interrupter 33 and the protector 31A are closed to energize the load bus 19 through the feeder circuit 93. This construction assures a dual source of electrical energy for the load bus 19 when the generating station includes only one electrical generator.

If an additional electrical generator, such as the generator 3, is to be added, the connections for this generator may be similar to those illustrated in Figs. 1 and 3. With both generators installed, the generator cannot be synchronized through the load bus 19. This is for the reason that the protectors 31 of the feeder circuit 25 can be in closed condition only if the circuit interrupters 15A and 33A are in closed condition. Moreover, the protectors 31A may be in closed condition only if the circuit interrupters 15A and 91A are in closed condition. For these reasons, synchronization of the generators 1 and 3 must take place through the power bus 5 in the modification illustrated in Fig. 4.

A specific construction for the system connecting the electrical generator 1 to the buses 5 and 19 is illustrated in Fig. 5. Except for the arrangement of pallet switches, the circuit interrupters 15A and 91A may be similar to the circuit interrupters 15 and 91 of Fig. 3. The feeder-circuit-interrupter 33A also is similar to the feeder-circuit-interrupter 33 of Figs. 1 to 3 except for the pallet switch arrangement thereon. For interlocking the network protectors 31 with the circuit interrupters 15A and 33A, the circuit interrupter 15A is provided with a pallet switch 101 having front contacts 103 and back contacts 105. In addition, the circuit interrupter 33A is provided with a pallet switch 107 having front contacts 109 and back contacts 111. By inspection of Fig. 5, it will be observed that the closing contacts 63 of the master relay are connected in series with the front contacts 109 and 103 of the pallet switches 107 and 101 for controlling the energization of the closing relay 57. Consequently, if either pair of contacts 103 or 111 is open, the circuit interrupter 51 of Fig. 5 cannot close.

Inspection of Fig. 5 also reveals the fact that the tripping contacts 65 of the master relay 61 associated with the protector 31 are connected in parallel with the back contacts 105 and 111 of the circuit interrupters 15A and 33A. Consequently, the tripping of either of the circuit interrupters 15A or 33A results in the tripping of the circuit interrupter 51.

In a somewhat similar manner, the network protector 31A is associated with a pallet switch on the circuit interrupter 91A having front contacts 113 and back contacts 115, and with a pallet switch on the circuit interrupter 15A having front contacts 117 and back contacts 119. The tripping contacts 65 of the master relay 61 associated with the network protector 31A are connected in parallel with the back contacts 115 and 119 of the circuit interrupters 91A and 15A. Consequently, tripping of either of these circuit interrupters results in a tripping operation of the circuit interrupter 51 located in the network protector 31A.

The closing contacts 63 of the master relay 61 employed for the network protector 31A are connected in series with the front contacts 113 and 117 of the circuit interrupters 91A and 15A. Therefore, the circuit interrupter 51 of the network protector 31A cannot close unless both of the circuit interrupters 15A and 91A are closed.

It will be understood that each of the network protectors 31 associated with one of the feeder circuits 25 or 27 is interlocked in the same manner with the related circuit interrupters. Also, each of the network protectors 31A is interlocked in the same manner with pallet switches provided on the circuit interrupters 91A and 15A.

Although the invention has been described with reference to certain specific embodiments thereof, numerous modifications are possible. Therefore, the invention is to be restricted only by the appended claims.

I claim as my invention:

1. In an electrical system, a power-bus, a plurality of electrical generators, means for connecting and disconnecting each of said electrical generators with respect to said power-bus, a load-bus, means for connecting said load-bus to said power-bus, means independent of said power-bus for connecting said load-bus selectively to either or to both of said electrical generators, and means permitting connection of said load-bus to said power-bus and to one of said electrical generators only if said one electrical generator is connected to said power-bus.

2. In an electrical system, a power-bus, a plurality of electrical generators, transformer means for coupling each of said generators to said power bus, circuit-interrupting-means controlling the connection of each of said generators to said power-bus through the associated transformer means, a load-bus, means for connecting said load-bus selectively to either or to both of said generators on the generator sides of the associated transformer means, and means permitting connection of said load-bus to one of said generators only if said one generator is connected to said power-bus.

3. In an electrical system, a power-bus, a plurality of electrical generators, transformer means for coupling each of said generators to said power bus, circuit-interrupting-means controlling the connection of each of said generators to said power-bus through the associated transformer means, a load-bus, means for connecting said load-bus selectively to either or to both of said generators on the generator sides of the associated transformer means, means responsive to the condition of said last-named connecting means when a fault occurs thereon for interrupting the connection of said load-bus to one of said generators through the faulty connecting means, and means permitting connection of said load-bus to one of said generators only if said one generator is connected to said power-bus.

4. In an electrical system, a power-bus, a plurality of electrical generators, means including a transformer and a first circuit-interrupter for coupling each of said generators to said power bus, a load-bus, and means for connecting each of said generators to said load-bus, at least one of said last-named means including a feeder circuit connected to the associated generator on the generator side of the associated first circuit-interrupter, a second circuit-interrupter in the feeder circuit for controlling the connection of the feeder circuit to said load-bus, and means permitting closure of said second circuit-interrupter only when the associated first circuit-interrupter is closed, whereby said generators cannot be synchronized through said load-bus.

5. In an electrical system, a power-bus, a plurality of electrical generators, means including a transformer and a first circuit-interrupter for coupling each of said generators to said power bus, a load-bus and means for connecting each of said generators to said load-bus, each of said last-named means including a feeder circuit connected to the associated generator on the generator side of the associated circuit-interrupter, a load-bus transformer, a second circuit-interrupter in the feeder circuit for controlling the connection of the feeder circuit to said load-bus through said load-bus transformer, means responsive to the direction of power flow therethrough for tripping said second circuit-interrupter, and means permitting closure of said second circuit interrupter only when the associated first circuit-interrupter is closed, whereby said generators cannot be synchronized through said load-bus.

6. In an electrical system, a power-bus, a plurality of electrical generators, means including a transformer and a first circuit-interrupter for coupling each of said generators to said power bus, a load-bus, means including a connecting circuit extending between said power-bus and said load-bus for transmitting power therebetween, circuit-breaker-means for controlling the connection of said power-bus to said load-bus through said connecting circuit, means responsive to the direction of power flow therethrough for tripping said circuit-breaker-means, and means for connecting each of said generators to said load-bus, each of said last-named means including a feeder circuit connected to the associated generator on the generator side of the associated circuit-interrupter, a second circuit-interrupter in the feeder circuit for controlling the connection of the feeder circuit to said load-bus, and means permitting closure of said second circuit-interrupter only when the associated first circuit-interrupter is closed, whereby said generators cannot be synchronized through said load-bus.

7. In an electrical system, a power-bus, a plurality of power transformers having primary and secondary windings, means including a first circuit-interrupter for connecting each of said secondary windings to said power-bus, a separate electrical generator connected to each of said primary windings for supplying power through said transformers to said power-bus, a load-bus, a first feeder circuit for supplying energy from said power-bus to said load-bus, means including a transformer and a circuit-breaker connecting said feeder circuit to said power-bus, means including a transformer and a circuit-breaker for connecting said feeder circuit to said load-bus, and means for connecting each of said generators to said load-bus, each of said last-named means comprising a second feeder circuit connected to the associated generator on the generator side of the associated power transformer, means including a transformer and a second circuit-interrupter for connecting said second feeder circuit to said load-bus, means responsive to the direction of power flow through said second circuit-interrupter for tripping said second circuit-interrupter, and means responsive to a tripped condition of the associated first-circuit-interrupter for maintaining said second circuit interrupter in tripped condition.

8. In an electrical system, a power-bus, a plurality of electrical generators, means including a transformer and a first circuit-interrupter for coupling each of said generators to said power-bus, a load-bus, means for connecting each of said generators to said load-bus, each of said last-named means including a feeder circuit connected to the associated generator on the generator side of the associated circuit-interrupter, a second circuit-interrupter in the feeder circuit for controlling the connection of the feeder circuit to said load-bus, means permitting closure of said second circuit interrupter only when the associated first circuit-interrupter is closed, whereby said generators cannot be synchronized through said load-bus, and circuit-interrupter-means intermediate one of said generators and its associated feeder circuit, whereby said load-bus may be energized from said power-bus when all of said generators are disconnected therefrom.

9. In an electrical system, a power-bus, a plurality of electrical generators, means including a transformer and a first circuit-interrupter for coupling each of said generators to said power bus, a load-bus, and means for connecting each of said generators to said load-bus, each of said last-named means including a feeder circuit connected to the associated generator on the generator side of the associated circuit-interrupter, a load-bus transformer, a second circuit-interrupter in the feeder circuit for controlling the connection of the feeder circuit to said load-bus through said load-bus transformer, means responsive to the direction of power flow therethrough for tripping said second circuit-interrupter, means permitting closure of said second circuit-interrupter only when the associated first circuit-interrupter is closed, whereby said generators cannot be synchronized through said load-bus, and circuit-interrupting-means intermediate one of said generators and its associated feeder circuit, whereby said load-bus may be energized from said power-bus when all of said generators are disconnected therefrom.

10. In an electrical system, an electrical generator, a power-bus, means for connecting said electrical generator to said power-bus, a load-bus, and means for energizing said load-bus from either said power-bus or said electrical generator, said last-named means comprising a feeder circuit, means for connecting a first end of said feeder circuit selectively to said power-bus or to both power-bus and said electrical generator, means connecting a second end of said feeder circuit to said load-bus, and means permitting connection of said feeder circuit to said electrical generator only when said electrical generator is connected to said power-bus.

11. In an electrical system, an electrical generator, a power-bus, transformer means, means for connecting said electrical generator to said power-bus through said transformer means, a load-bus, and means for energizing said load-bus from either said power-bus or said electrical generator, said last-named means comprising a feeder circuit, means for connecting a first end of said feeder circuit selectively to said power-bus through said transformer means to both said power-bus through said transformer means and said electrical generator, means connecting a second end of said feeder circuit to said load bus, means permitting connections of said feeder circuit to said electrical generator only when said electrical generator is connected to said power-bus, a second feeder circuit, means connecting a first end of said second feeder circuit to said electrical generator, and means connecting a second end of said second electrical generator to said load-bus for energizing said load-bus independently of said first feeder circuit.

12. In an electrical system, an electrical generator, a power-bus, transformer means, means for connecting said electrical generator to said power-bus through said transformer means, a load-bus, and means for energizing said load-bus from either said power-bus or said electrical generator, said last-named means comprising a feeder circuit, means for connecting a first end of said feeder circuit selectively to said power-bus through said transformer means or to both said power-bus through said transformer means and said electrical generator, means connecting a second end of said feeder circuit to said load bus, means permitting connections of said feeder circuit to said electrical generator only when said electrical generator is connected to said power-bus, a second feeder circuit, means connecting a first end of said second feeder circuit to said electrical generator, means connecting a second end of said second feeder circuit to said load-bus for energizing said load-bus independently of said first feeder circuit, and means permitting connection of said load-bus through said second feeder circuit to said electrical generator only when said electrical generator is connected to said power-bus.

13. In an electrical system, an electrical generator, a power-bus, transformer means, means for connecting said electrical generator to said power-bus through said transformer means, a load-bus, and means for energizing said load-bus from either said power-bus or said electrical generator, said last-named means comprising a feeder circuit, means for connecting a first end of said feeder circuit selectively to said power-bus through said transformer means or both said power-bus through said transformer means and said electrical generator, means connecting a second end of said feeder circuit to said load bus, means permitting connection of said feeder circuit to said electrical generator only when said electrical generator is connected to said power-bus, a second feeder circuit, means connecting a first end of said second feeder circuit to said electrical generator, and means connecting a second end of said second feeder circuit to said load-bus for energizing said load-bus independently of said first feeder circuit, said means for connecting said feeder circuits to said load-bus including means responsive to the condition of one of said feeder circuits when a fault occurs thereon for disconnecting said faulty feeder circuit from said load-bus.

14. In an electrical system, a power-bus, an electrical generator, a transformer for coupling said electrical generator to said power-bus, first circuit-interrupting-means for controlling the connection of said electrical generator to said transformer, second circuit-interrupting-means for controlling the connection of said transformer to said power-bus, a load-bus, and means for energizing said load-bus from either said power-bus or said electrical generator, said last-named means comprising a first feeder circuit, third circuit-interrupting-means connecting a first end of said first feeder circuit to a point intermediate said first circuit-interrupting-means and said transformer, transformer means for coupling a second end of said first feeder circuit to said load-bus, fourth circuit-interrupting-means controlling the connection of said transformer means to said load-bus, means permitting said fourth circuit-interrupting-means to be in closed condition only when said second and third circuit-interrupting-means are in closed condition, a second feeder circuit having a first end connected between said electrical generator and said first circuit-interrupting-means, transformer means for coupling a second end of said second feeder circuit to said load bus, fifth circuit-interrupting-means controlling the connection of said last-named transformer means to said load-bus, and means permitting said fifth circuit-interrupting-means to be in closed condition only when said first and second circuit-interrupting-means are in closed condition.

ALEXANDER C. MONTEITH.